UNITED STATES PATENT OFFICE.

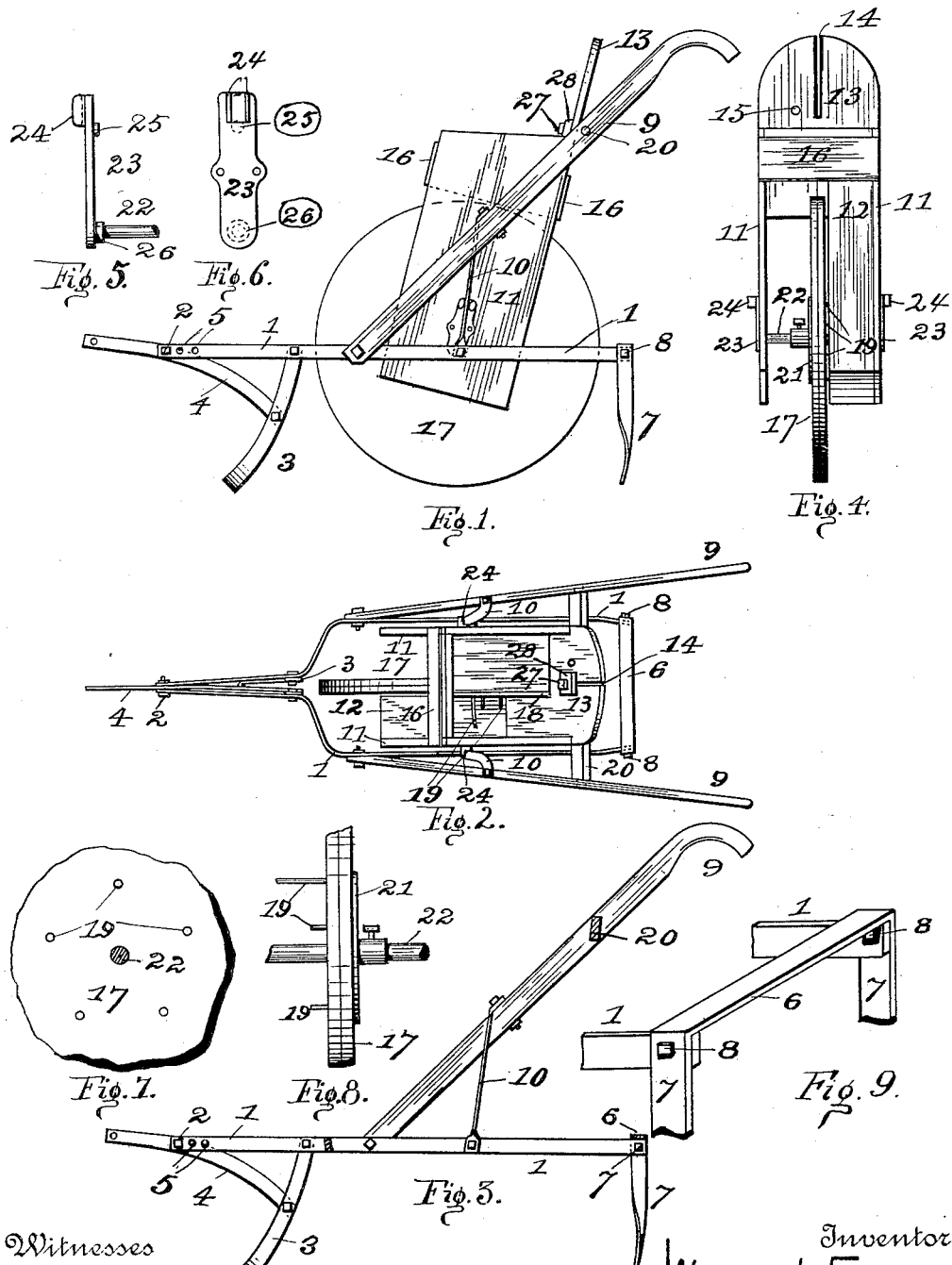

WILLIAM J. EASON, OF WOODBURY, GEORGIA.

PLANTER AND FERTILIZER-DISTRIBUTER.

SPECIFICATION forming part of Letters Patent No. 462,759, dated November 10, 1891.

Application filed May 2, 1891. Serial No. 391,429. (No model.)

*To all whom it may concern:*

Be it known that I, WILLIAM J. EASON, a citizen of the United States, and a resident of Woodbury, in the county of Meriwether and State of Georgia, have invented certain new and useful Improvements in Planters and Fertilizer-Distributers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to seeders and distributers and to the class of such devices as are capable of distributing seed or fertilizer in drills, opening the ground, and covering the seed respectively before and after dropping, the object of the invention being the improvement of the art in various ways looking toward simplicity, durability, and inexpensiveness of construction, and facility of adjustment and convenience of operation, the details of the device forming this present invention being hereinafter fully described.

In the accompanying drawings, Figure 1 is a side elevation of the device, showing all the parts assembled. Fig. 2 is a plan of the device, further showing the elements of construction. Fig. 3 is a side elevation of the frame with the distributing mechanism removed, a portion of a side bar and one of the handles being removed to more clearly show several elements. Fig. 4 is a front view of the hopper, showing the wheel side brackets, distributing-slot beside the wheels, and several other details. Figs. 5 and 6 are respectively edge and side views of the side brackets; and Figs. 7 and 8 are respectively side and edge views of a portion of the wheel, showing said wheel, its flange, and agitating-spikes, and shaft or axle. Fig. 9 is a view in isometric perspective showing the attachment of the covers.

In the figures like reference-characters are employed in the designation of corresponding elements in all the views.

The frame 1 is composed of two side pieces which are parallel for a little more than half their length and a short distance apart converging near their middle portions and again running approximately parallel and close together, being secured together at their forward ends by the bolt 2, the additional function of which will be seen. A standard or foot 3 is pivoted near the point of convergence, being held between the side pieces by a bolt passing through the whole, which said bolt also obviously holds the frame together. Pivotally secured about midway of the standard 3 is a draft-bar 4, which passes between the forward extremities of the side pieces of the frame and is held by the bolt 2. Thus it is seen that a greater part of the strain of the opener or plow is taken from the frame and that a still greater proportion thereof will be removed from said frame by pivoting the bar 4 lower down upon the standard.

For purposes of adjustment of the standard to change the angle of the blade in the ground, a multiplicity of holes 5 for the bolt 2 are provided in the forward end of the frame, as shown in Figs. 1 and 3. It would not be a departure from the invention were these holes 5 made in the box 4 instead of in the frame-pieces. A clevis or other means for the attachment of a whiffletree is provided on the forward extremity of the said bar 4. The posterior portion of the frame is held from spreading and the coverers are attached and held rigid in the manner as follows: A bar of iron long enough to span the distance between the side pieces and to form the coverer-teeth is bent downwardly at each end, leaving a horizontal portion 6 of a length required to span said distance, and teeth 7 of the desired form are shaped on the end of each of said downwardly-bent portions. The part so formed is then placed over the two side pieces of the frame, so that the portion 6 is above and the teeth 7 are outside of the said side pieces, and coincidental holes are then made and bolts 8 inserted. Handles 9 are bolted to the side pieces just back of the springing-point of the inward bend of said sides, and braces 10 of metal are bolted to the said side pieces and extend in substantially a vertical position to the said handles. Besides being braces, these bars 10 also form guides for the distributing mechanism in its vertical movements, as will now be described, the width of said braces being set transversely of the frame, as best shown in Fig. 3, for that purpose. The handles are held apart by a rung 20, preferably rectangular in form.

The hopper is composed of two side pieces 11 and a front 12, and a back-piece 13, said back piece being provided with a slot 14 and a hole 15, the functions of which will be hereinafter specified. Cross-pieces 16 are provided to tie the structure rigidly together. Approximately half of the space between the sides is open for the wheel 17, and the other portion is inclosed by a partition 18 and a hopper formed thereby. The partition 18 is cut short at the bottom, leaving a hole in the side of said hopper. The wheel 17 runs a short distance from the side 18, and has side pins or beaters 19, part of which may be longer than the others to more thoroughly agitate the material to be distributed, said pins projecting into the opening left in the hopper by cutting away the partition 18. The wheel 17 is preferably made of wood and held integral by a flange 21, set-screwed on the shaft 22. If desired, for greater security the pins 19 may project through the wheel from this flange, being either cast or riveted therein.

Brackets 23, provided with lips 24, forming a guide, and having lugs 25 and 26 on opposite ends therefrom, enter the sides of the hopper 11 and assist the necessary screws in holding said brackets 23 rigid on the said sides 11. In the lugs 26 of the opposite brackets the shaft of the wheel 17 is journaled. When the hopper is in position within the frame 1, the lips 24 engage the guides, as shown in Fig. 1, thus providing for vertical motion of the hopper within the frame. The back 13 of the hopper rests against the rung 20 between the handles, and a bolt 27 passes through both rung and the slot 14 in said back and washer 28 being employed, as shown. This construction limits side and upward motion of the hopper. A hole 15 is provided in the back 13, which said hole when the hopper is depressed serves to receive a nail or pin, which will rest under the rung and allow the implement to be transported upon the wheel 17, the opener and coverers being thus held out of contact with the ground.

In this device it is obvious that the operator has full control of the plow and coverers without in any way affecting the operation of the hopper or distributing mechanism.

It is obvious that many of the details of this invention might be considerably varied without a departure from the spirit of the invention.

Having thus described my invention, what I claim as new, and desire to secure by Letters Patent of the United States, is—

1. In a device of the class specified, the standard, and a draft-iron secured to near the middle of said standard, and a brace or bar secured to the upper end of said standard and to the draft-iron, substantially as shown and described.

2. In a device of the class specified, a standard, a draft-iron pivotally secured to near the middle of said standard, and a brace pivotally secured to the upper end of said standard and adjustably secured to the said draft-iron, substantially as and for the purpose specified.

3. In a device of the class specified, a frame comprising side pieces suitably held, relatively stationary handles secured to said side pieces, braces extending in a substantially vertical direction, each secured at one end to said frame side pieces and at the other end to the handle on the same side, a hopper carrying a wheel contacting with the ground, and slides adapted to engage and move vertically upon said braces, substantially as and for the purpose specified.

4. In a device of the class specified, a frame and vertical guides carried thereon, the handles secured to said frame rigidly and having a rung between them, and the slides engaging said guides, and having one of its side walls slotted to receive the bolt passing through said slot and rung and forming a guide to the vertical motion of said hopper, substantially as and for the purpose specified.

In testimony whereof I affix my signature in presence of two witnesses.

WILLIAM J. EASON.

Witnesses:
W. P. WALKER,
R. H. JOHNSTON.